(12) United States Patent
Akiba et al.

(10) Patent No.: US 6,334,718 B1
(45) Date of Patent: Jan. 1, 2002

(54) CAMERA HAVING A LENS BARRIER

(75) Inventors: Makoto Akiba; Kazuaki Nagata, both of Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 4 days.

(21) Appl. No.: 09/585,270

(22) Filed: Jun. 2, 2000

(30) Foreign Application Priority Data

Jun. 3, 1999 (JP) ............................................. 11-156610

(51) Int. Cl.⁷ ........................ G03B 17/00; G03B 17/04; G03B 5/02; G03B 11/04
(52) U.S. Cl. ........................ 396/448; 396/348; 396/349; 359/511
(58) Field of Search ................................. 396/348, 349, 396/448; 359/511

(56) References Cited

U.S. PATENT DOCUMENTS 5,461,441 A * 10/1995 Kotani .......................... 396/61
5,892,998 A * 4/1999 Kodaira et al. ............. 396/448
5,987,263 A * 11/1999 Toyoda et al. .............. 396/178

* cited by examiner

Primary Examiner—David M. Gray
Assistant Examiner—Rochelle Blackman
(74) Attorney, Agent, or Firm—Young & Thompson

(57) ABSTRACT

A camera is provided with a lens barrier for covering and uncovering an opening which is formed in a front face of the camera and is for exposing a taking lens. The lens barrier protects the taking lens when the camera is not used. The lens barrier is driven by a motor. This motor is controlled by a motor control unit relative to its rotational direction (forward and backward direction), its rotational amount and its rotational speed. As the motor, a DC motor is used. Into this DC motor, drive-pulse trains having different duty factor are inputted to control the rotational speed. Owing to this, an operation speed of the lens barrier is controlled so as to be faster when the lens barrier opens the opening, and so as to be slower when the lens barrier closes the opening.

12 Claims, 10 Drawing Sheets

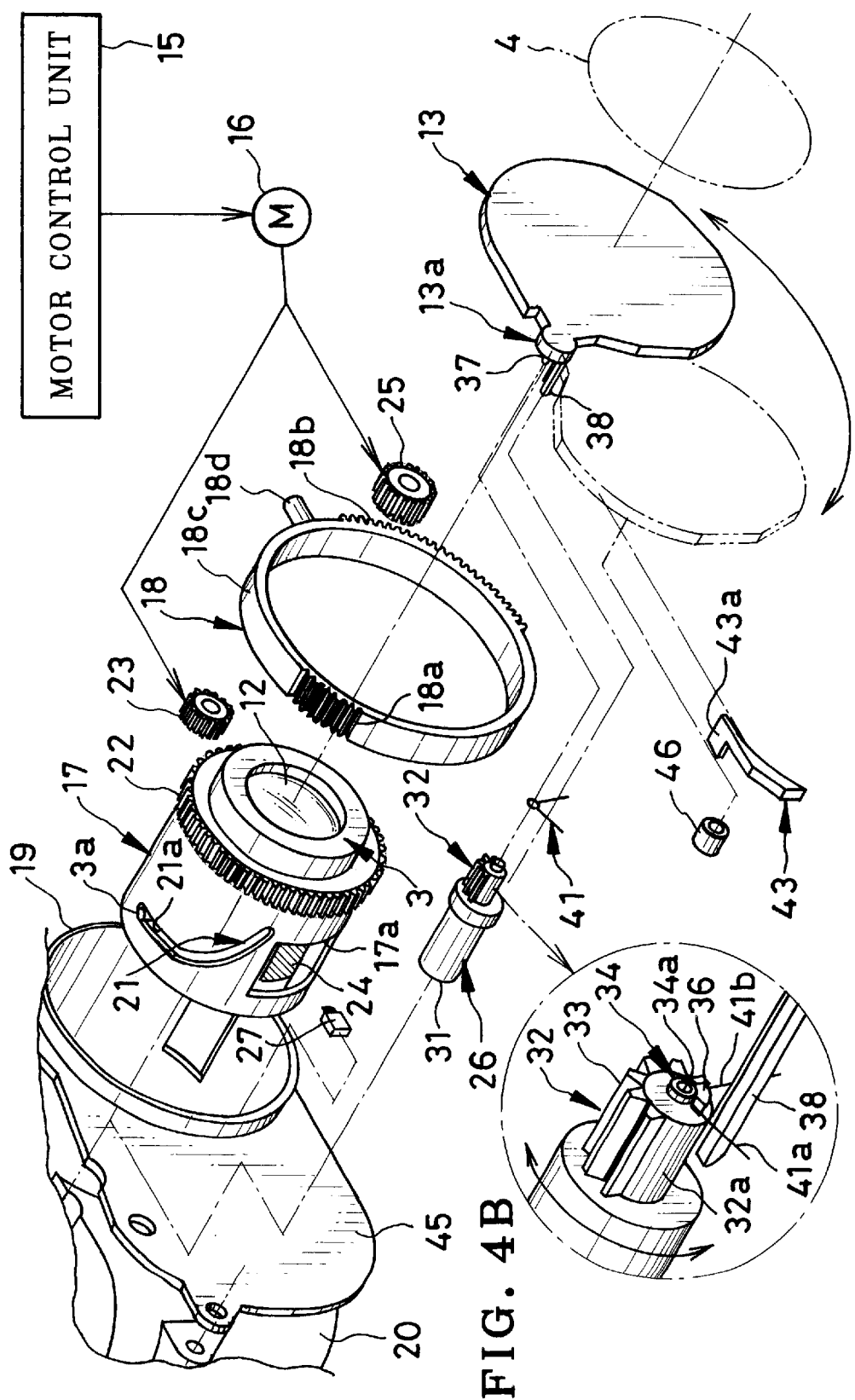

CAMERA HAVING A LENS BARRIER

BACKGROUND OF THE INVENTION

1. Field of the Invention

The present invention relates to a camera having a lens barrier which protects a taking lens by covering it at the time of non-usage.

2. Description of the Related Art

A camera having a lens barrier is known. The lens barrier is for protecting a taking lens. For example, the camera having the lens barrier is provided with an opening formed in a front face of a camera body and for exposing the taking lens. This opening is uncovered by moving the lens barrier so as to cross a photographic optical path.

In a recent camera, such lens barrier is moved by a motor. When a main switch of the camera is turned on, the lens barrier is evacuated from the photographic optical path to expose the taking lens. When the switch is turned off, the lens barrier is put at the optical path to cover the taking lens. In virtue of this, the taking lens is protected when the camera is not used, for example, while the camera is carried so that it is possible to keep the taking lens in a good condition. Meanwhile, some type of a camera having the lens barrier is provided with a lens barrel which protrudes from an opening at the time of usage and is collapsed into the opening at the time of non-usage. In this type, the lens barrel is fully covered with the lens barrier when the camera is not used. Thus, unevenness of an external shape of the camera may be reduced at the time of non-usage so that it is convenient for keeping the camera. Recently, a compact camera adopting such structure increases.

As to the camera in which the lens barrier is operated by a motor, a drive speed of the motor is quickened so as not to miss a shutter chance. Owing to this, it is possible to rapidly switch the camera from the non-usage state to the usage state. By the way, in a conventional camera, when the lens barrier is closed, the motor is reversed without changing the drive speed thereof. Thus, there arises a problem in that a finger of a user is likely to be injured, since there is a possibility that the finger is caught between an edge of the opening and the lens barrier.

SUMMARY OF THE INVENTION

In view of the foregoing, it is a primary object of the present invention to provide a camera having a lens barrier in which a finger is hardly caught in the lens barrier when the lens barrier is closed, whereas the lens barrier can be rapidly opened.

It is a second object of the present invention to provide a camera having a lens barrier in which a drive speed of a motor for operating the lens barrier is easily adjusted at low cost.

In order to achieve the above and other objects, the camera according to the present invention comprises a lens barrier which is opened and closed by a motor. The lens barrier covers and uncovers an opening formed in a front face of the camera. The opening is for exposing a taking lens of the camera.

When the camera is used, the lens barrier is opened to expose the taking lens through the opening. When the camera is not used, the opening is covered with the lens barrier to protect the taking lens.

A drive speed of the motor for operating the lens barrier is controlled by a motor control unit. When the motor opens the lens barrier, the drive speed of the motor is controlled by the motor control unit so as to be faster. Thus, the lens barrier is rapidly opened. When the motor closes the lens barrier, the drive speed of the motor is controlled by the motor control unit so as to be slower. Thus, the lens barrier is closed at a slower speed in comparison with the opening speed thereof.

In a preferred embodiment, a DC motor is used as the motor. When the lens barrier is closed, the motor control unit intermittently drives the DC motor for a predetermined period so as to gradually slow down the drive speed of the DC motor.

Further, in a preferred embodiment, the opening for exposing the taking lens is formed in a camera body. A lens barrel incorporated with the taking lens is thrust out and is collapsed through this opening. The operation of the lens barrier and the movement of the lens barrel are performed by a single motor.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 4A is an exploded perspective view showing an operation mechanism of a lens barrier;

FIG. 4B is an enlarged view showing a barrier drive gear;

DETAILED DESCRIPTION OF THE PREFERRED EMBODIMENT(S)

Figure 2:
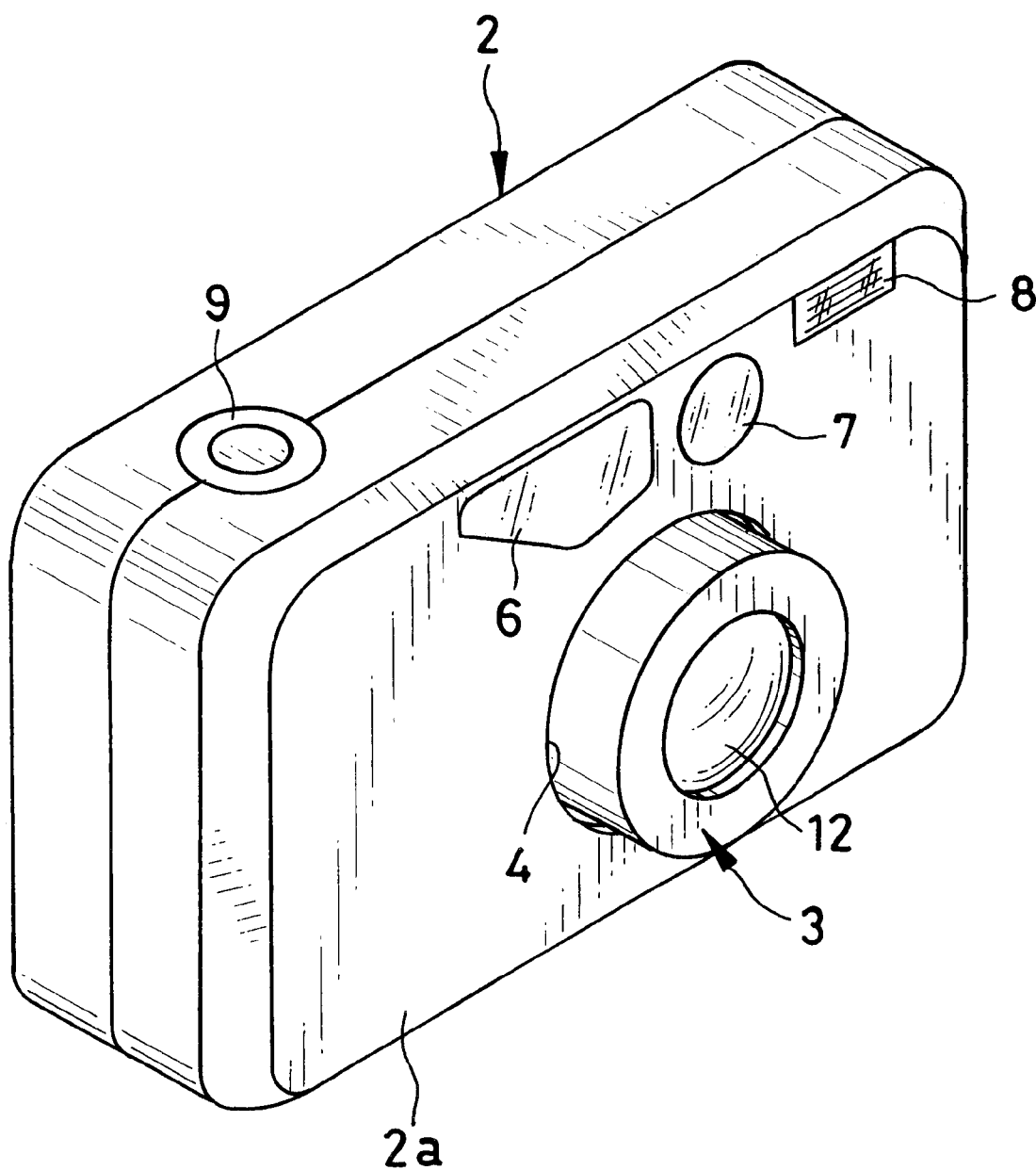
FIG. 2 is a perspective view showing a camera in a usage state.

As shown in FIG. 2, a camera 2 has a camera body 2a and a lens barrel 3. The front of the camera body 2a is provided with an opening 4 for baring the lens barrel 3, a viewfinder cover 6, a light-emitting window 7 for measuring a distance, and a flash window 8. The viewfinder cover 6 covers a viewfinder and a light-receiving unit for measuring a distance. An upper face of the camera 2 is provided with a shutter button 9. A taking lens 12 constituting a zoom lens is incorporated in the lens barrel 3. Further, a rear face of the camera 2 is provided with a main switch, a zoom switch, and a liquid crystal panel for displaying a photographable number and a date. Upon turning on the main switch, the lens barrel 3 is thrust from the inside of the opening 4 toward a position of a wide-angle side, such as shown in FIG. 2, to set the camera 2 in a photographable state. The lens barrel 3 is further thrust to perform zooming in response to an operation of the zoom switch.

Figure 3:
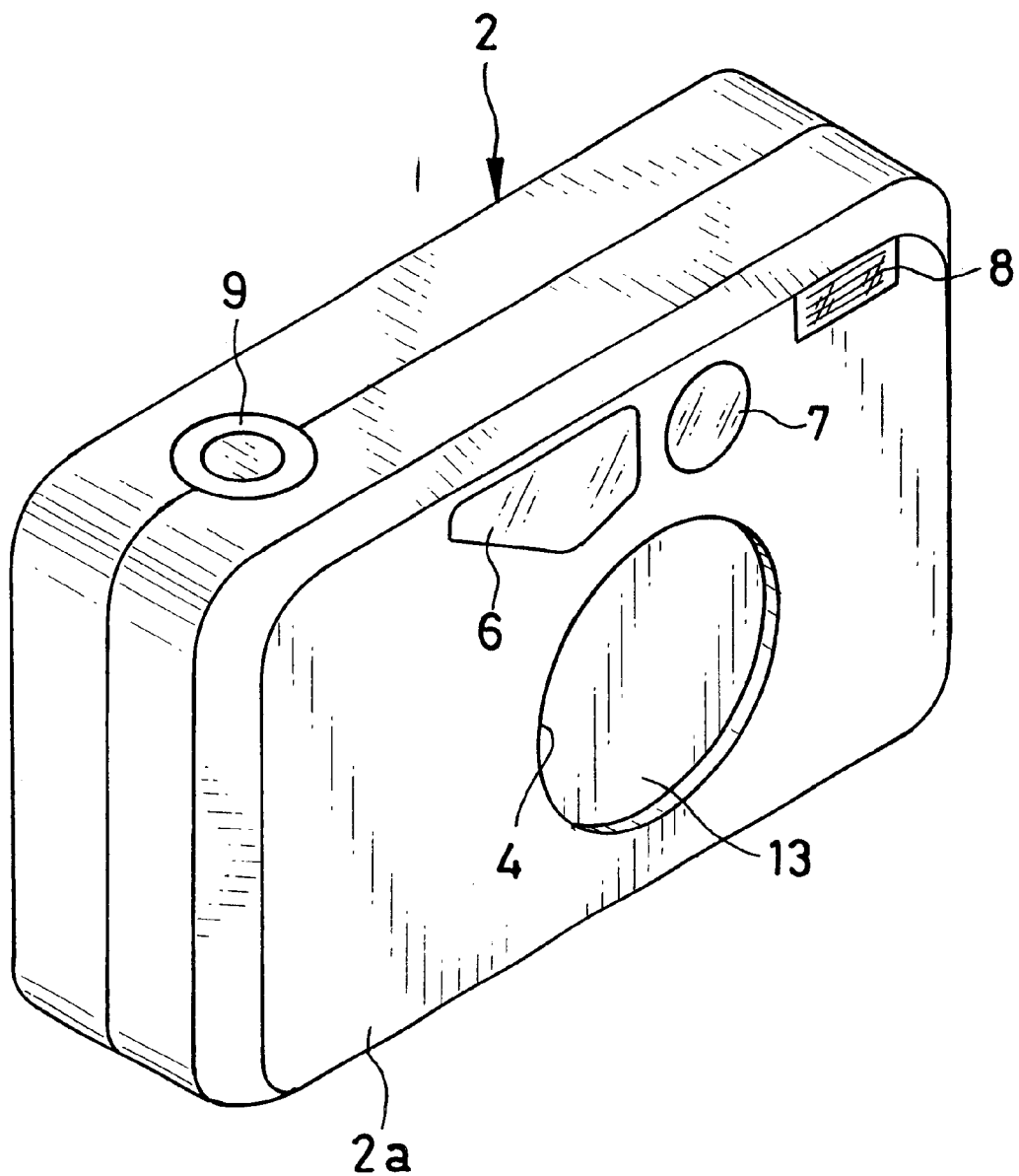
FIG. 3 is a perspective view showing the camera in a non-usage state.

When the main switch is turned off, the lens barrel is collapsed into the opening 4 and is covered with a lens barrier 13 such as shown in FIG. 3 illustrating a non-usage state of the camera 2. The lens barrier 13 moves crosswise relative to a photographic optical path so as to open and close the opening 4. At the time of usage, the lens barrier 13 is evacuated from the photographic optical path to open the opening 4 so that the taking lens 12 is exposed. At the time of non-usage, the lens barrier 13 is disposed at the optical path to close the opening 4 so that the taking lens 12 is covered therewith. Since the taking lens 12 is not bared at the time of non-usage, the taking lens 12 is protected while the camera is not used.

The lens barrier 13 is operated by a motor 16 such as shown in FIG. 4A. The motor 16 actuates the lens barrier 13 via a gear train. Further, the motor 16 actuates the lens barrel 3 as well. The motor 16 is controlled by a motor control unit 15 to be turned on and off. This motor control unit 15 also controls a rotational direction of the motor 16 (a forward direction and a backward direction) and a rotational speed thereof.

The lens barrel 3 is contained in a fixed barrel 19, which is integrally formed with a main body 20, together with a driving barrel 17 in which the lens barrel 3 is contained. A periphery of the driving barrel 17 is formed with a gear 22 arranged at a front end thereof. The gear 22 meshes with a barrel drive gear 23 so that a rotation of the motor 16 is transmitted to the driving barrel 17 via this gear 23. Meanwhile, a cam groove 21 and an opening 17a are formed behind the gear 22. The cam groove 21 engages with a cam pin 3a provided on the lens barrel 3. The opening 17a is for baring an encoder 24 provided on the lens barrel 3.

When the driving barrel 17 is rotated, the lens barrel 3 is moved in an optical axis direction due to the engagement of the cam groove 21 and the cam pin 3a. One side of the cam groove 21 has a straight portion 21a which is formed in a perpendicular direction relative to the optical axis direction. The straight portion 21a engages with a cam pin 3a until the lens barrier 13 fully opens the opening 4, while the straight portion 21a engages with the cam pin 3a, the lens barrel 3 is not moved. In virtue of this, it becomes possible to drive both of the lens barrier 13 and the drive barrel 17 by a single motor 16.

The encoder 24 is provided in the optical axis direction of the lens barrel 3. The encoder 24 has a positional code of a collapsible-mount position of the lens barrel 3. Besides this, the encoder 24 has positional codes of a wide-angle position, a telephoto position, and plural zoom positions between the wide-angle position and the telephoto position. These positional codes are formed by thin metal elements for example, and are constituted of different conductive patterns corresponding to the respective positions. The positional code is read out by a position detect sensor 27, a sensing portion of which is provided with a metal brush. The position detect sensor 27 is securely attached to the inside of the fixed barrel 19, and reads the encoder 24 through the opening 17a to obtain positional information of the lens barrel 3. The positional information is sent to the motor control unit 15. Incidentally, the driving barrel 17 is rotated so that a size of the opening 17a is determined in accordance with a rotational range of the driving barrel 17.

The rotation of the motor 16 is transmitted to the lens barrier 13 via a ring drive gear 25, a ring gear 18 and a barrier drive gear 26. The ring gear 18 is rotatably supported by the fixed barrel 19. A periphery of the ring gear 18 is provided with a first transfer gear 18a and a second transfer gear 18b. The first transfer gear 18a engages with the barrier drive gear 26. The second transfer gear 18b is arranged at a position opposite to the first transfer gear 18a, and engages with the ring drive gear 25. As to teeth of the first transfer gear 18a and the second transfer gear 18b, numbers thereof are determined so as to be capable of fully opening the lens barrier 13. Between the first transfer gear 18a and the second transfer gear 18b, a slide surface 18c is formed. The slide surface 18c slidably contacts with the barrier drive gear 26 after the lens barrier 13 has reached an open position.

Moreover, the periphery of the ring gear 18 is provided with a pin 18d for regulating a rotational amount of the ring gear 18 within a predetermined range. The pin 18d is located so as to abut when the lens barrier 13 is closed and the motor 16 is stopped. Thus, in case the motor 16 is not stopped by trouble, the pin 18d becomes a stopper for prohibiting the rotation of the ring gear 18.

The barrier drive gear 26 is rotatably supported by the main body 20. The barrier drive gear 26 comprises a support portion 31 for supporting itself, and a drive portion 32 provided in front of the support portion 31. A half periphery of the drive portion 32 is formed with a pinion gear 33 for engaging with the first transfer gear 18a. A front end of the drive portion 32 is provided with a hollow shaft 34. At the outside of the hollow shaft 34, a crescent-shaped protrusion 36 is provided. The hollow shaft 34 has a hole 34a into which a pin 37 formed on a bearing portion 13a of the lens barrier 13 is inserted. In virtue of this, the lens barrier 13 is rotatably supported. At this time, a coiled spring 41 is rotatably attached to the periphery of the hollow shaft 34.

The coiled spring 41 is for opening and closing the lens barrier 13. The protrusion 36 is located between legs 41a and 41b of the coiled spring 41. When the barrier drive gear 26 is rotated forward in a clockwise direction, the leg 41a is pushed by the protrusion 36 to rotate the coiled spring 41 in the same direction. When the barrier drive gear 26 is reversed in a counterclockwise direction, the leg 41b is pushed to rotate the coiled spring 41 in the reverse direction.

Further, between the legs 41a and 41b, a lever 38 provided on the bearing portion 13a is disposed under the protrusion 36. When the barrier drive gear 26 is rotated in the clockwise direction and the protrusion 36 pushes the leg 41a, the other leg 41b pushes the lever 38. Hence, the lens barrier 13 is rotated in an opening direction. To the contrary, when the barrier drive gear 26 is rotated in the counterclockwise direction and the protrusion 36 pushes the leg 41b, the leg 41a pushes the lever 38 to rotate the lens barrier 13 in a closing direction.

Figure 5A:
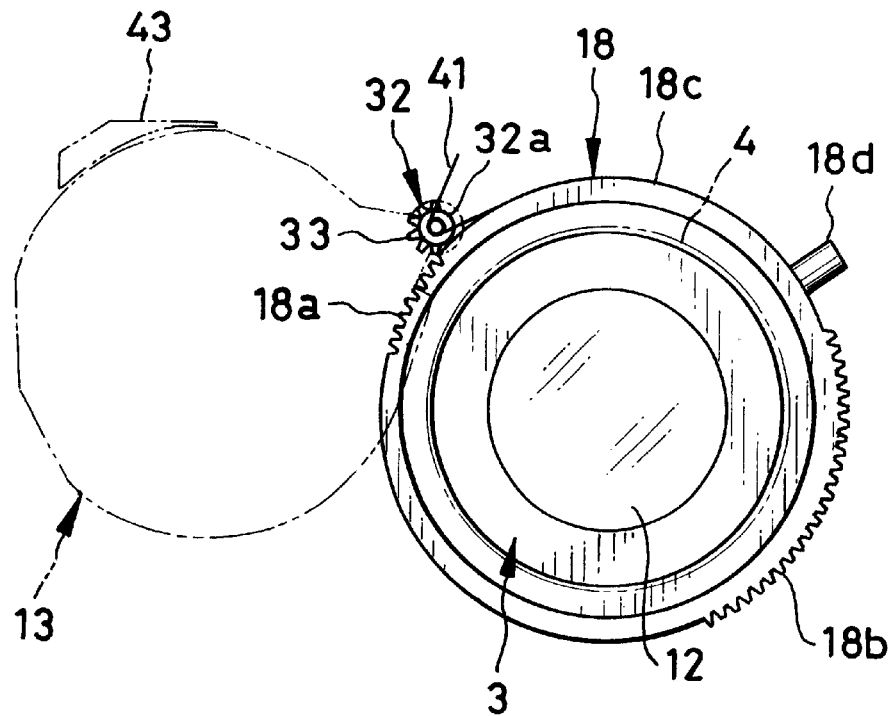
FIGS. 5A and 5B are explanatory illustrations showing contact states of the barrier drive gear and a ring gear at the time of zooming.
Figure 5B:
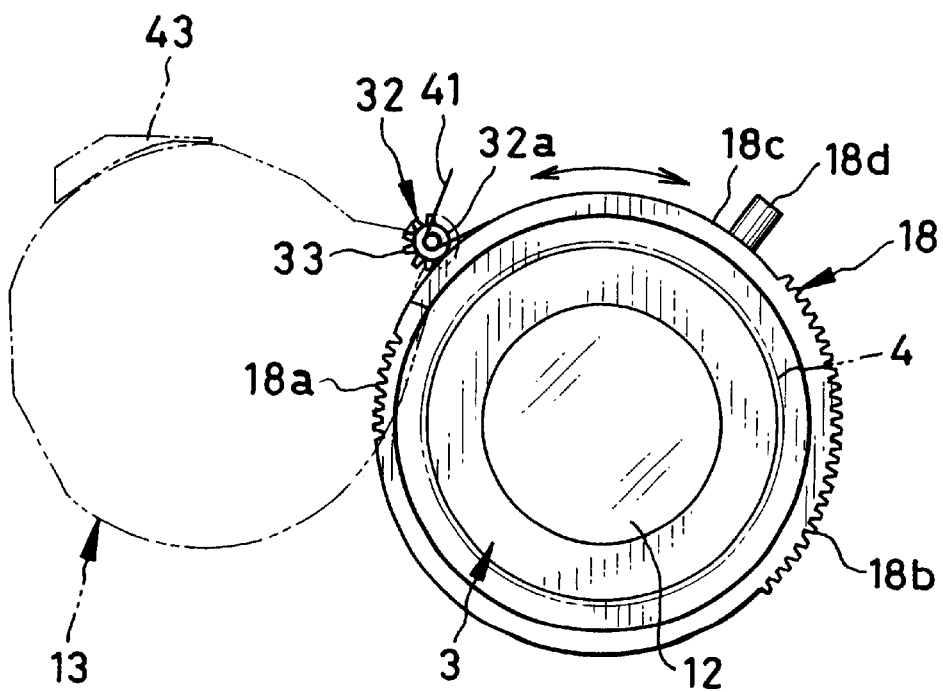

The pinion gear 33 is formed on the half periphery of the drive portion 32 and a teeth number thereof is determined in accordance with the first transfer gear 18a. As shown in FIG. 5A, when an opening operation of the lens barrier 13 is over, engagement of the pinion gear 33 and the first transfer gear 18a is also over. Meanwhile, the top of the first transfer gear 18a coincides with the slide surface 18c. Accordingly, when the lens barrel 3 is thrust out, a slide surface 32a of the drive portion 32 abuts on the slide surface 18c of the ring gear 18 such as shown in FIG. 5B. At this time, the edge of the pinion gear 33 also abuts on the slide surface 18c. Thus, the pinion gear 33 is prevented from rotating in the reverse direction so that the lens barrier 13 is not rotated in the closing direction.

When the opening operation is completed, the lens barrier 13 is kept in a barrier open position where the lens barrier 13 is fully opened. At this barrier open position, a stopper 43 having elasticity is provided. One end 43a of the stopper 43 is fixed to a support plate 45 provided in front of the main body 20. The stopper 43 collides with the lens barrier 13 to regulate its movement when the lens barrier 13 has reached the barrier open position. Since the lens barrier 13 is directly actuated by the coiled spring 41, rebounding of the coiled spring 41 is absorbed by the stopper 43. In virtue of this, even if the lens barrier 13 is vigorously rotated in the opening direction, its momentum is absorbed by the stopper 43. Thus, rebounding of the lens barrier 13 in the closing direction is reduced.

A barrier detect sensor 46 is provided under the stopper 43 and is fixed to the support plate 45. The barrier detect sensor 46 is constituted of a photo sensor, for example. When the lens barrier 13 comes to the front of the sensor 46, the sensor 46 detects the completion of the opening operation of the lens barrier 13. And then, a signal representing that the lens barrier 13 is opened is sent to the motor control unit 15. If the lens barrel 3 is thrust out while the signal is not sent, that is, while the opening operation of the lens barrier 13 is not yet completed, the rotation of the motor 16 is stopped.

Figure 1:
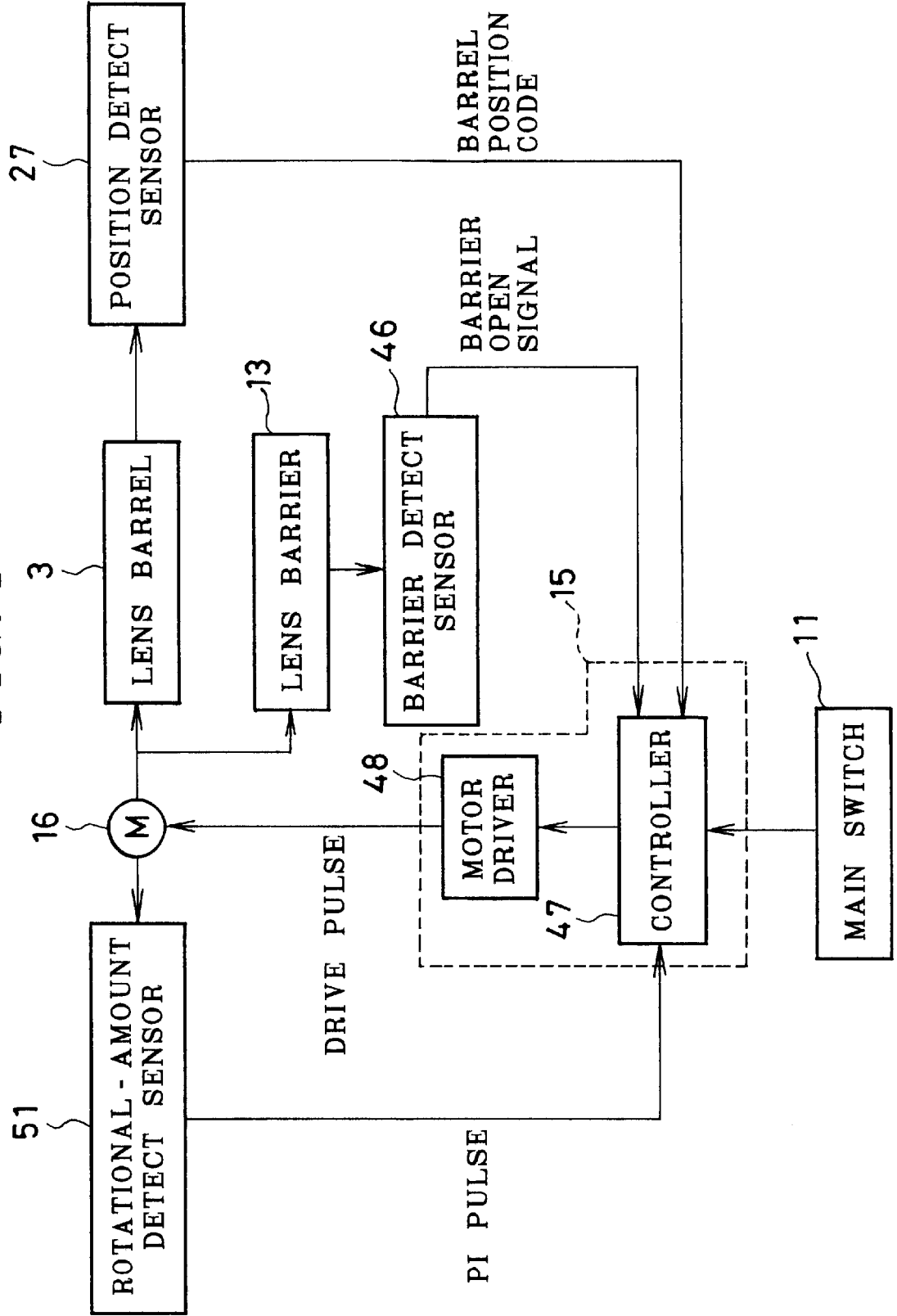
FIG. 1 is a block diagram showing structure for driving a motor.

The motor control unit 15 comprises a controller 47 and a motor driver 48 such as shown in FIG. 1. The controller 47 includes a CPU, a memory, an LUT, a counter and so forth. The motor driver 48 drives the motor 16 on the basis of an instruction outputted from the controller 47. Into the motor control unit 15, are inputted signals from the position detect sensor 27 and the barrier detect sensor 46. Besides these signals, a signal from a rotational-amount detect sensor 51 is also inputted. The sensor 51 is for detecting a rotational amount of the motor 16, and is constituted of a photo sensor, for example, which reads an encoder plate provided on a rotary shaft of the motor 16 to detect the rotational amount. A detection signal from the sensor 51 is sent to the controller 47 as a PI (photo interrupter) pulse.

The rotational amount of the motor 16 is controlled in a way that a predetermined value written in the LUT is read out by the controller 47 to be set in the counter, and then, the value of the counter is successively decreased in response to the PI pulse which is inputted from the rotational-amount detect sensor 51 to the controller 47. The predetermined value corresponds to the rotational amount of the motor 16 being necessary for the operation in which the lens barrier 13 is actuated and the lens barrel 3 is moved. For example, with respect to the operation from the close position of the lens barrier 13 to the wide-angle position of the lens barrel 3, the rotational amount being necessary for this operation is determined as a value K.

As to the motor 16 driven by the motor driver 48, a DC motor is employed. The rotational speed of the motor 16 is adapted to be changed in three steps. The rotational speed is adjusted by intermittently applying a predetermined voltage to the motor 16. This intermittent drive is performed in accordance with a drive pulse outputted from the motor driver 48.

Figure 6:
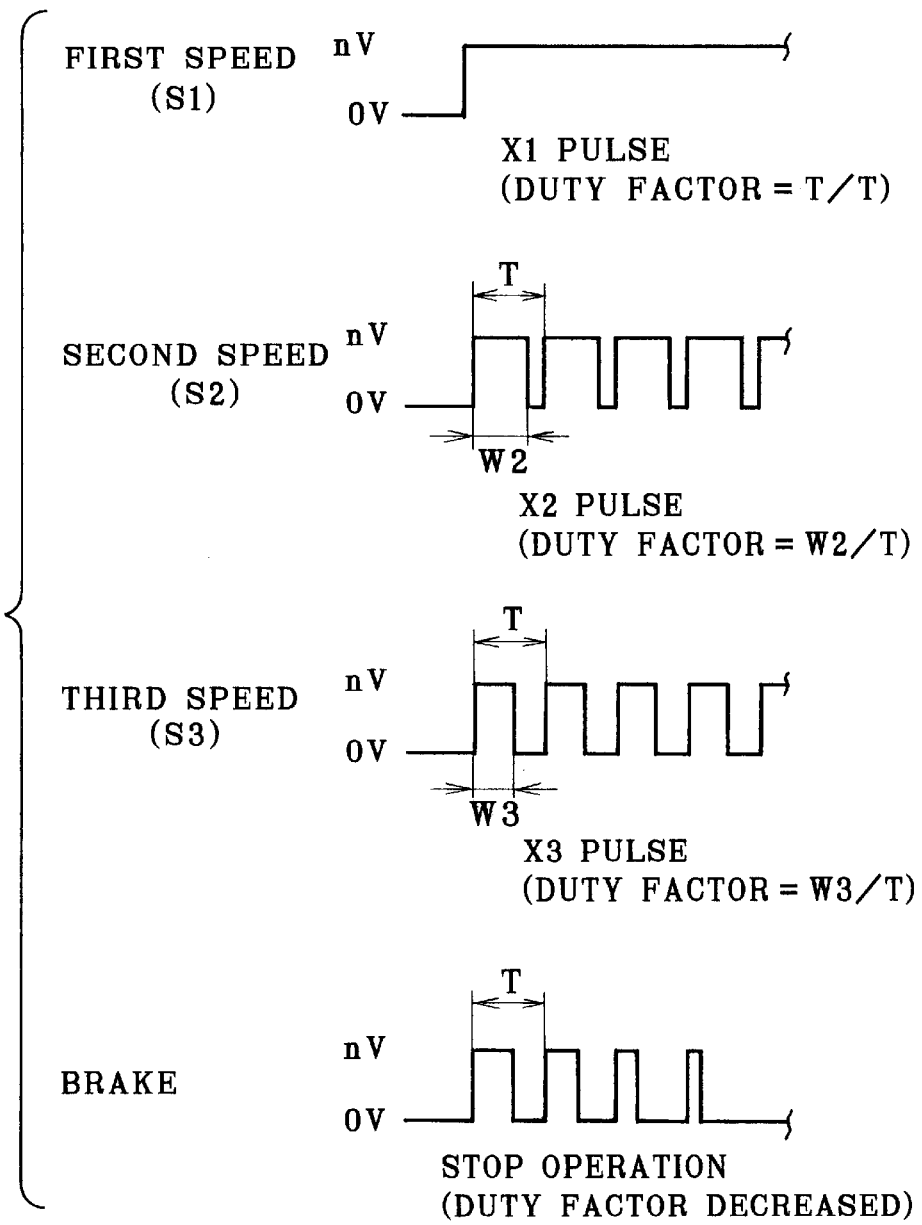
FIG. 6 is an explanatory illustration showing drive pulses for driving a motor.

The drive pulse is selected among three kinds of an X1 pulse, an X2 pulse and an X3 pulse shown in FIG. 6. Each of the three-kind pulses has different duty factor. This duty factor is a ratio of pulse duration W to a pulse cycle T of a cyclical pulse train. During the pulse duration W, a predetermined voltage (nV) is applied. The rotational speed of the motor 16 is adjusted in the three steps from the fastest first speed (S1) to the slowest third speed (S3) in accordance with the X1 pulse through the X3 pulse. The X1 pulse has the duty factor of 100% and the X3pulse has the lowest duty factor.

Besides the three kinds of the speed adjustments, there is another speed adjustment in order to carry out a stop operation of the motor 16. In the stop operation, the rotational speed of the motor 16 is slowed down by gradually reducing the duty factor. The stop operation functions as a brake when the rotation of the motor 16 is stopped. Changing to the stop operation is performed, for example, when the PI pulse is successively subtracted from the set-up rotational amount of the motor 16 and the remainder of the rotational amount has reached a prescribed value. The controller 47 judges this point as a brake position.

Figure 7:
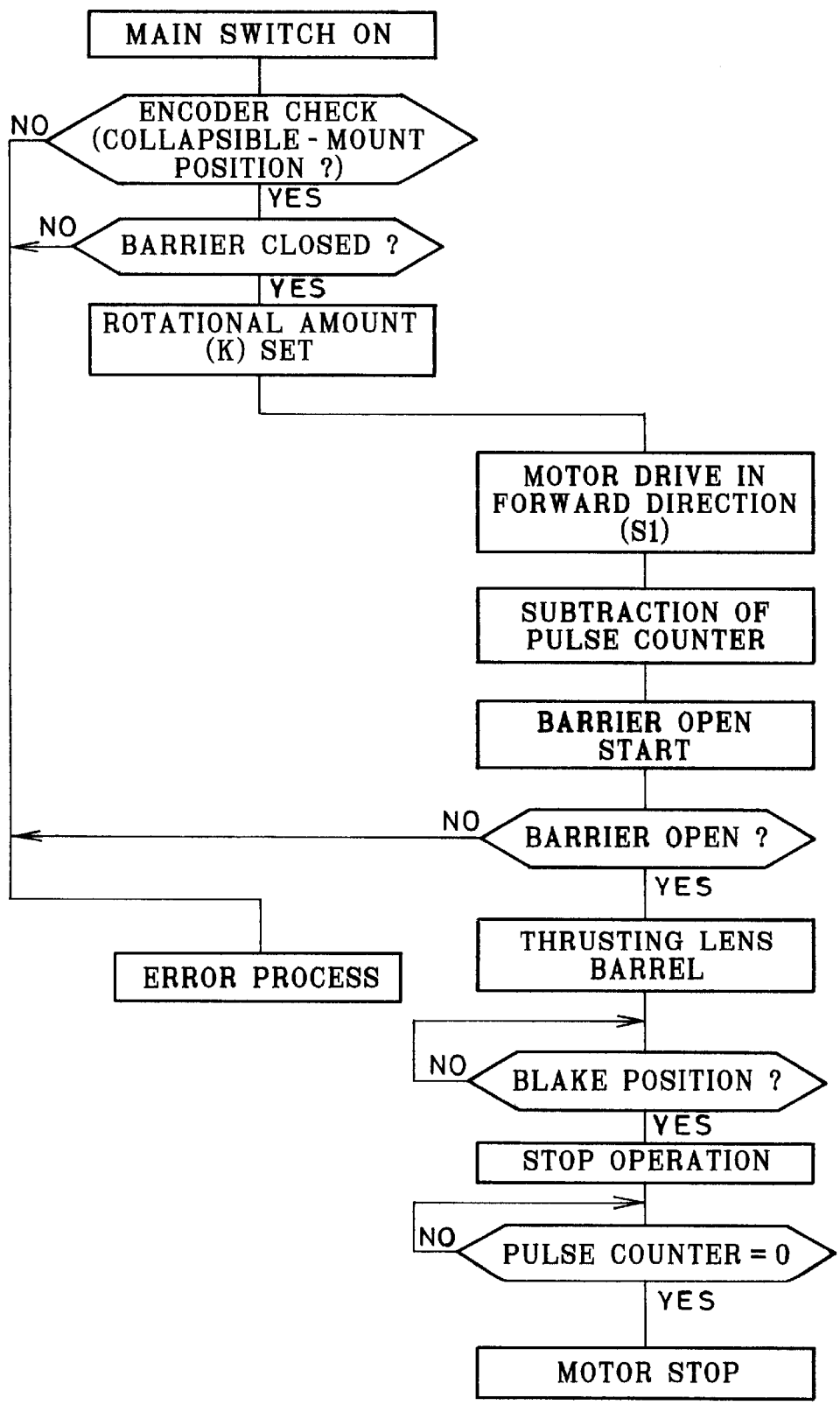
FIG. 7 is a flow chart showing a process for opening the lens barrier.
Figure 8:
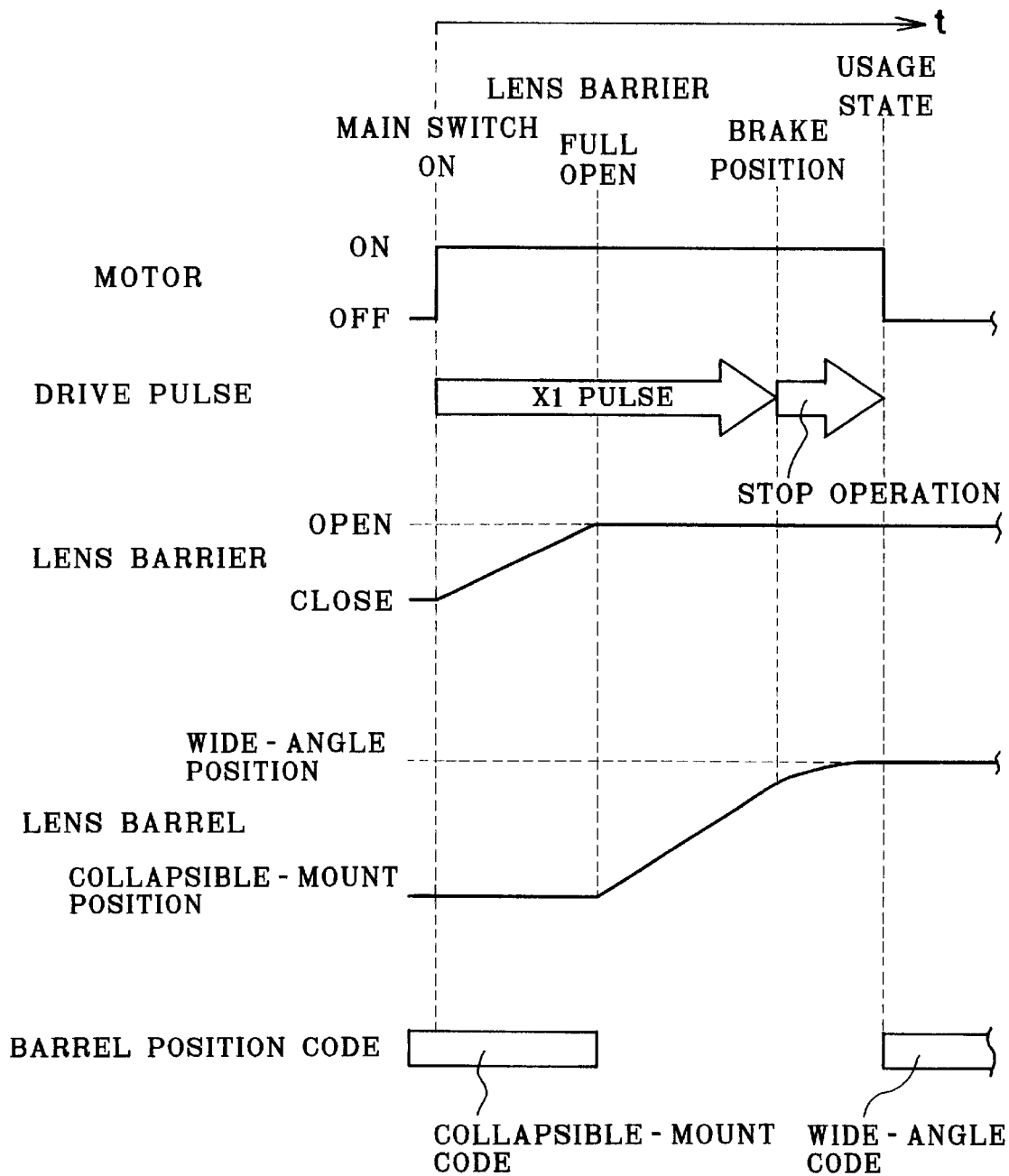
FIG. 8 is a time chart explaining the process for opening the lens barrier.
Figure 9:
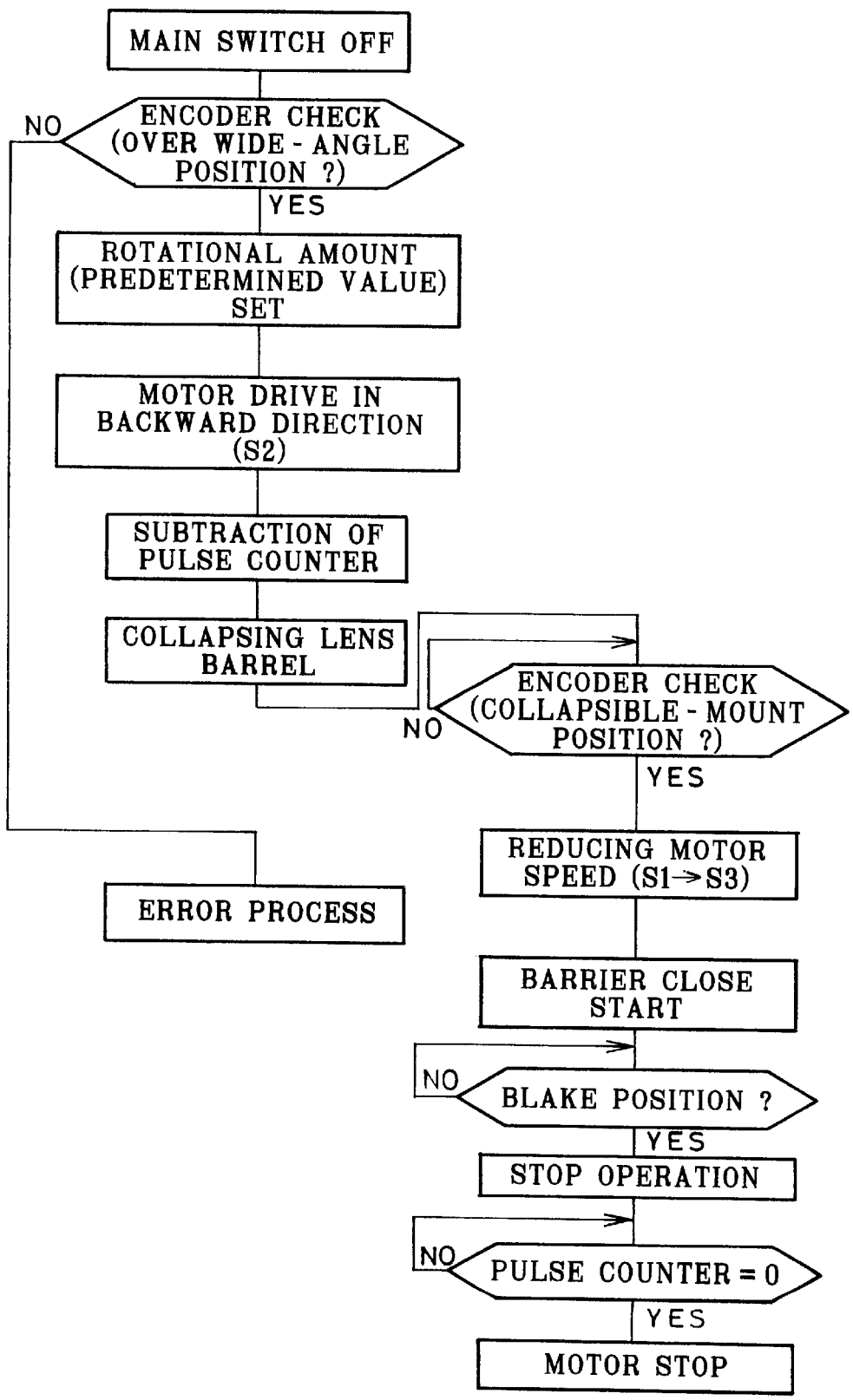
FIG. 9 is a flow chart showing a process for closing the lens barrier.
Figure 10:
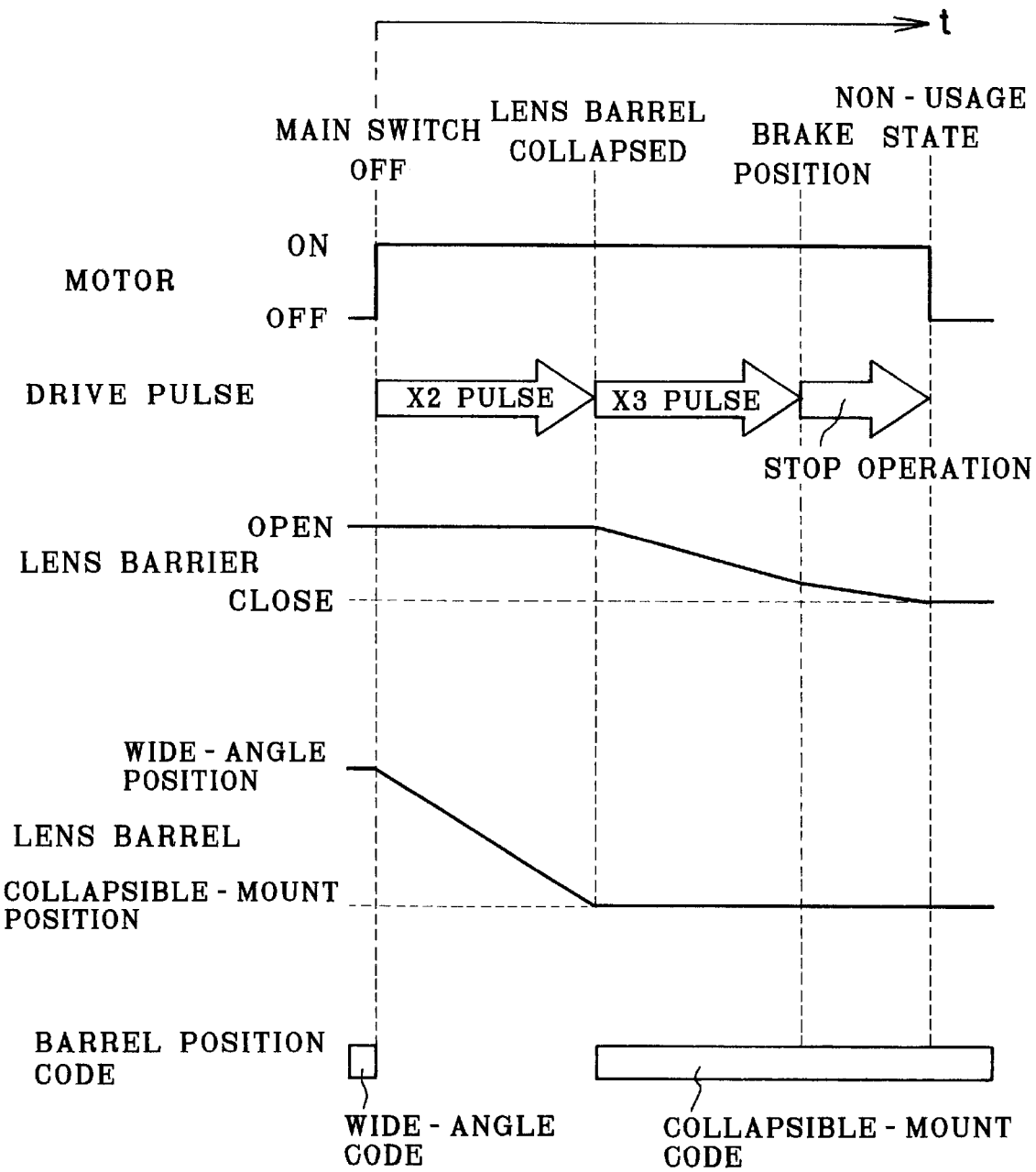
FIG. 10 is a time chart explaining the process for closing the lens barrier.

An operation of the above-mentioned structure is described below, referring to FIG. 7 through FIG. 10. FIG. 7 is a flow chart showing a process for opening the lens barrier 13, and FIG. 8 is a time chart thereof. FIG. 9 is a flow chart showing a process for closing the lens barrier 13, and FIG. 10 is a time chart thereof.

In the opening process of the lens barrier 13 shown in FIGS. 7 and 8, when the main switch 11 is turned on, the position detect sensor 27 checks the encoder 24. If the lens barrel 3 is kept in the collapsible-mount position, the barrier detect sensor 46 checks that the lens barrier 13 is closed. When the above check conditions are not satisfied, an error process is carried out to display an error message on the liquid crystal panel.

When the lens barrier 13 is confirmed to be kept in the close position, the rotational amount (K) of the motor 16 is set in the counter of the controller 47. Then, the motor 16 receives the X1 pulse from the driver 48 and starts to rotate in the forward direction at the first speed (S1). In response to the rotation of the motor 16, the controller 47 begins the subtraction of the counter in accordance with the PI pulse outputted from the rotational-amount detect sensor 51.

The rotation of the motor 16 is transmitted to the lens barrier 13 via the ring drive gear 25, the ring gear 18 and the barrier drive gear 26. Owing to this, the opening operation of the lens barrier 13 is started. Meanwhile, the rotation of the motor 16 is also transmitted to the driving barrel 17 via the barrel drive gear 23 so that the driving barrel 17 begins to rotate. However, the lens barrel 3 does not thrust out until the lens barrier 13 is fully opened, since the straight portion 21a of the driving barrel 17 engages with the cam pin 3a.

When the lens barrier 13 reaches the open position, the lens barrier 13 abuts on the stopper 43. Although the lens barrier 13 collides with the stopper 43, an impact of the collision is absorbed by the elasticity of both of the stopper 43 and the coiled spring 41. In virtue of this, rebounding of the lens barrier 13 is reduced. A shock traveling to a photographer is also reduced.

When the lens barrier 13 reaches the open position, it is detected by the barrier detect sensor 46 and the barrier detect signal is sent to the motor control unit 15. After the motor control unit 15 has received the barrier detect signal, the rotation of the motor 16 is continued to thrust out the lens barrel 3 from the collapsible-mount position. By the way, in case the barrier detect signal is not received before the lens barrel 3 is thrust out, the motor control unit 15 stops the rotation of the motor 16. As a matter of course, the rotation of the driving barrel 17 is also stopped so that the lens barrel 3 is not thrust out. In this way, the lens barrel 3 is adapted not to be thrust out in a state that the opening 4 is not fully opened. Thus, the lens barrel 3 is prevented from colliding with the lens barrier 13.

After the lens barrier 13 has reached the open position, the barrier drive gear 26 is released from the first transfer gear 18a, and then, the slide surface 32a of the barrier drive gear 26 abuts on the slide surface 18c of the ring gear 18. In virtue of this, the barrier drive gear 26 is not rotated after thrusting out the lens barrel 3 from the collapsible-mount position.

The lens barrel 3 is thrust out until the vicinity of the wide-angle position, and the remainder of the set-up rotational amount reaches the prescribed value. At this time, the controller 47 judges the current position as the brake position. Upon this judgement, changing to the stop operation is performed. In the stop operation, the rotational speed of the motor 16 is gradually decreased. When the lens barrel 3 reaches the wide-angle position, the rotation of the motor 16 is stopped. As stated above, the lens barrier 13 opens the opening 4 at the fastest first speed (S1) so that the usage state of the camera is rapidly accomplished. Thus, it is prevented that a lot of time is taken for photographic preparation and a shutter chance is missed. In the usage state, a photographer manipulates the zoom switch at will to perform zooming of the lens barrel 3.

Next, in the closing process of the lens barrier 13 shown in FIGS. 9 and 10, when the main switch 11 is turned off, the position detect sensor 27 checks the encoder 24. Further, it is checked that the lens barrel 3 is located between the wide-angle position and the telephoto position. In case the lens barrel 3 is located between the wide-angle position and the collapsible-mount position, an error process is carried out to display an error message on the liquid crystal panel.

After checking the encoder 24 and confirming the current position of the lens barrel 3, a rotational amount, which corresponds to movement from the current position to the close position of the lens barrier 13, is set in the counter. Then, the motor 16 receives the X2 pulse from the motor driver 48 to rotate in the backward direction at the second speed (S2). The rotation of the motor 16 is transmitted to the driving barrel 17 so that collapsing the lens barrel 3 is started. Upon the rotation of the motor 16, the subtraction of the counter is started in response to the PI pulse inputted from the rotational-amount detect sensor 51.

When the lens barrel 3 reaches the collapsible-mount position, the position detect sensor 27 outputs a barrel-position code (collapsible-mount code) to the controller 47. Upon this, the drive pulse sent to the motor 16 is changed from the X2 pulse to the X3 pulse. Thus, the rotational speed of the motor 16 is slowed down at the third speed (S3).

Meanwhile, when the lens barrel 3 comes to the collapsible-mount position, the pinion gear 33 engages with the second transfer gear 18b to start the closing operation of the lens barrier 13. The lens barrier 13 begins to close the opening 4 at the current speed, and approaches the fully closed position. When the remainder of the rotational amount has reached the prescribed value, the brake position is judged by the controller 47 and the motor 16 is changed into the stop operation. In the stop operation, the motor 16 is gradually slowed down and is stopped when the lens barrier 13 reaches the fully closed position. At the same time, the pin 18d abuts on the main body 20. Accordingly, even if the motor 16 is not stopped, the rotation of the ring gear 18 is forcibly stopped by the pin 18d.

In the closing process of the lens barrier 13, the rotational speed of the motor 16 is slowed down at the third speed (S3). If a finger of a photographer is inserted into the opening 4 during the closing operation, sufficient time for evacuating the finger from the opening 4 is obtained. Further, if the finger comes into contact with the lens barrier 13 and is interposed between the lens barrier 13 and the edge of the opening 4, the finger is not injured, since the speed of the lens barrier is slower. The lens barrier 13 is actuated via the coiled spring 41. Thus, in the closing operation, it is possible to hold the lens barrier 13 for a short period due to the elasticity of the coiled spring 41 so that the time for evacuating the finger is obtained after the finger has contacted the lens barrier 13.

The present invention has been described, referring to the preferred embodiment. However, the present invention is not exclusive to the above embodiment and is capable of being variously modified. In the above embodiment, the camera having the zoom lens is adopted for explanation. However, it is possible to apply the present invention to cameras in which the zoom lens is not employed and the lens barrel is not thrust out of the opening. Moreover, the present invention may be applied to not only a camera using a photo film but also an electronic still camera.

In the above embodiment, the motor is explained as the DC motor. However, a pulse motor and so forth may be used to adjust the rotational speed. Moreover, in the above embodiment, the lens barrier and the lens barrel are driven by a single motor. Although it is preferable to utilize a single motor, an individual motor may be employed to drive each of the lens barrier and the lens barrel.

Further, in the above embodiment, the lens barrier is provided in the camera body. Alternatively, the lens barrier may be provided in the lens barrel and in front of the taking lens.

As stated above, the camera having the lens barrier according to the present invention comprises the motor for operating the lens barrier, and the controller for controlling the motor. The controller drives the motor such that the closing speed of the lens barrier is slower than the opening speed thereof. Thus, the lens barrier may be rapidly opened, whereas it is possible to prevent a trouble in that a finger is interposed between the lens barrier and the opening when the lens barrier is closed.

Most of recent compact cameras have a micro computer comprising a pulse oscillator. Thus, it is possible to adjust the rotational speed easily and at low cost by employing the DC motor. This DC motor is intermittently driven to slow down its drive speed. Further, the lens barrier and the lens barrel are driven by a single motor so that it is possible to achieve simplicity and low cost.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a lens barrier which is movable between a closed position and an open position, said lens barrier being set to said closed position for covering a taking lens when said camera is not used, and said lens barrier being set to said open position for exposing said taking lens when said camera is used, said camera comprising:

a motor for actuating said lens barrier; and motor control means for driving said motor, said motor control means controlling a drive speed of said motor to change an opening speed and a closing speed of said lens barrier such that said closing speed is slower than said opening speed.

2. A camera according to claim 1, wherein said motor is a DC motor, and when said lens barrier is closed, said motor control means slows down said drive speed of said DC motor by intermittently driving said DC motor at least for a fixed period.

3. A camera according to claim 2, further comprising:

a camera body;

an opening formed in said camera body, said opening being closed when said lens barrier is set to said closed position, and said opening being opened when said lens barrier is set to said open position; and a movable lens barrel incorporated with said taking lens, said lens barrel being protruded forward through said opening while said camera is used, and said lens barrel being reversed to be contained in said camera body while said camera is not used.

4. A camera according to claim 3, wherein said lens barrel is moved by said motor for actuating said lens barrier, said lens barrel being protruded after said lens barrier has been set to said open position, and said lens barrier being set to said closed position after said lens barrel has been contained in said camera body.

5. A camera according to claim 4, wherein said DC motor is driven by a first pulse train, a second pulse train and a third pulse train each of which has a different duty factor, said first pulse train having the highest duty factor and said third pulse train having the lowest duty factor, said drive speed of said motor being lowest when driven by said third pulse train.

6. A camera according to claim 5, wherein said duty factor of said first pulse train is 100%.

7. A camera according to claim 6, wherein said DC motor is driven by said first pulse train when said lens barrier is opened and said lens barrel is protruded, said DC motor is driven by said second pulse train when said lens barrel is collapsed, and said DC motor is driven by said third pulse train when said lens barrier is closed.

8. A camera according to claim 7, wherein said duty factor of said third pulse train is gradually lowered and said closing speed of said lens barrier is gradually slowed down to stop said lens barrier.

9. A camera according to claim 8, wherein said duty factor of said third pulse train is gradually lowered for a predetermined period just before said lens barrier is stopped.

10. A camera according to claim 9, further comprising:

a position detect sensor for detecting a position of said lens barrel.

11. A camera according to claim 10, wherein said lens barrier is set from said open position to said closed position after said position detect sensor has confirmed that said lens barrel is collapsed.

12. A camera having a lens barrier which is movable between a closed position and an open position, said lens barrier being set to said closed position for covering a taking lens when said camera is not used, and said lens barrier being set to said open position for exposing said taking lens when said camera is used, said camera comprising:

a barrier actuating mechanism for opening and closing said lens barrier, said barrier actuating mechanism driving said lens barrier such that a closing speed of said lens barrier is slower than an opening speed thereof.

* * * * *